3,651,001
PIGMENTED PAINTS
Heinrich Meckbach, Leverkusen, Dietrich Glabisch, Opladen, and Herbert Bartl, Cologne-Stammheim, Germany, assignors to Farbenfabriken Bayer Aktiengesellschaft, Leverkusen, Germany
No Drawing. Filed Mar. 12, 1968, Ser. No. 712,393
Claims priority, application Germany, Apr. 5, 1967, F 52,024
Int. Cl. C09d 3/00
U.S. Cl. 260—29.6                                2 Claims

ABSTRACT OF THE DISCLOSURE

A pigmented paint having a continuous aqueous phase including a binder of a copolymer of ethylene, a half ester of a $\alpha,\beta$-unsaturated dicarboxylic acid or a salt thereof, vinyl chloride and vinyl ester in specified proportions.

---

The invention relates to pigmented paints with a continuous aqueous phase which contain, as binders, copolymers of ethylene, semiesters of $\alpha,\beta$-unsaturated dicarboxylic acids, vinyl chloride and vinyl esters.

It is known that pigmented emulsions which have a continuous aqueous phase and which are made of homo- or copolymers of monoolefinically unsaturated compounds such as vinyl esters, acrylic and methacrylic acid esters, styrene, vinyl chloride, and conjugated diolefines such as butadiene, isoprene etc. can be used as paints (see e.g. German Auslegeschrift No. 1,019,783).

It is also known to add auxiliary agents such as thickeners, wetting agents, protective colloids, defoaming agents, buffers, plasticisers, disinfectants, preservatives and the like to the pigment emulsions or dispersions.

The "classical" polymers for emulsion paints are, first, polyvinyl acetate, second, butadiene-styrene copolymers and lastly, polymers of acrylic or methacrylic acid esters.

Although films of polyvinyl acetate emulsions have excellent weather resistance and resistance to light, they are extremely sensitive to water and liable to swell. On exposure to water, the film immediately loses its strength and toughness and is therefore easily damaged mechanically. Moreover, the polyvinyl acetate film is, of course, very easily saponifiable. The pigment binding capacity of these films is relatively low, i.e. with a pigment content of over 500%, the mechanical strength of such films is only slight even in the dry state.

The films of butadiene/styrene copolymers, on the other hand, have excellent wet strength, are not saponifiable, and can be pigmented to very high pigment contents. However, they have little resistance to weathering and undergo marked yellowing on exposure to light.

Lastly, films of polymers of acrylates or especially of methacrylates are also completely light-fast and have excellent resistance to weathering and they also have better alkali resistance than polyvinyl acetate films but again they do not have a high pigment uptake capacity and are not especially abrasion resistant on exposure to water.

The strong tendency of polyvinyl acetates to swell is considerably reduced by copolymerising vinyl acetate with acrylates or preferably with methacrylates; in addition, such copolymers are more resistant to saponification although they are by no means unsaponifiable. The wet strength thereby achieved in the films does not, however, satisfy the most stringent requirements and furthermore, the pigment binding capacity of such copolymers is only slightly better than that of pure polyvinyl acetate. The tendency to swell on exposure to water can be further diminished by employing vinyl propionate instead of vinyl acetate as homopolymer or as copolymer with acrylates or methacrylates. However, all copolymers hitherto produced from monomeric, polymerisable esters have the characteristic that the films produced from them are subject to a certain mechanical deterioration in the wet.

Attempts have also been made to improve the weather resistance of butadiene/styrene polymers by copolymerising them with acrylates or methacrylates. However, such copolymerisations usually diminish the wet abrasion resistance of butadiene-styrene polymer films without substantially improving their weather resistance.

Although many of the emulsions mentioned here give a very good weather resistant film, these films often have a certain tackiness so that, even if they have a relatively high pigment content, paints produced from these emulsions can be observed gradually to get dirty on exposure to weathering.

Lastly, it is also known that emulsion copolymers of vinyl chloride and ethylene yield films which are relatively water-resistant and resistant to saponification while still having sufficient weather-resistance. These films have, however, the disadvantage that they cease to yield non-sticky surfaces as soon as the copolymer has relatively high ethylene contents (above 10 to 15% by weight), with the results that coats produced from them have a very strong tendency to get dirty owing to their tackiness. Furthermore, these films only have insufficient pigment binding capacity if the emulsions from which they are produced have been prepared without the use of external emulsifiers.

The object of the present invention is to produce pigmented paints which do not have the disadvantages described above and which therefore provide coats which have a good resistance to light and weathering, a very high pigment content, good alkali resistance and excellent wet abrasion resistance.

The invention relates to pigmented paints with a continuous aqueous phase, made of pigments, binders and, if necessary, auxiliary agents, characterized by containing binders of copolymer emulsions of copolymers comprising 9 to 20% by weight of ethylene, 2 to 12% by weight of a semiester of an $\alpha,\beta$-unsaturated dicarboxylic acid the alcohol component of which preferably contains up to 8 C-atoms, and 68 to 89% by weight of a mixture of vinyl chloride and a vinyl ester of a saturated carboxylic acid with 2 to 3 C-atoms, in which the vinyl ester content should be 15 to 45% of the sum of vinyl ester and vinyl chloride.

The copolymer emulsions to be used as binders are prepared in accordance with our copending application S.N. 689,957, filed Dec. 12, 1967.

Suitable half esters of $\alpha,\beta$-unsaturated dicarboxylic acids include those with 1 to 8 carbon atoms in the alcohol moiety, for example, the mono methyl, ethyl, propyl, butyl, cyclohexyl and 2-ethylhexyl esters of maleic acid, fumaric acid or itaconic acid. These monomers are preferably used in the form of their water-soluble salts, for example, sodium, potassium or ammonium salts.

Vinyl acetate and/or vinyl propionate are conveniently used as the vinyl esters. Vinyl acetate is preferred.

The above copolymer emulsions may have solids contents of 25 to 70% by weight. Copolymers of lower solids contents can easily be concentrated by creaming or evaporation.

It is preferred to use copolymer emulsions with a solids content of 50 to 60% by weight.

In the present application, auxiliary agents are understood to mean the following:

Thickeners such as methyl cellulose, carboxymethyl cellulose, hydroxyethyl cellulose, sodium alginate, ammonium alginate, ammonium polyacrylate or ammonium polymethacrylate etc.

Wetting agents such as, for example, addition products of 10 or more mols of ethylene oxide with 1 mol of a phenol or a substituted phenol.

Protective colloids such as casein, starch, gum arabic, animal glue etc.

Defoaming agents such as phosphoric acid esters, long-chain aliphatic alcohols, polysiloxanes etc.

Buffers such as mixtures of primary and secondary alkali metal phosphates, borax, sodium acetate etc.

Plasticisers such as adipic acid esters and phthalic acid esters, trialkyl and triaryl phosphates, glycerol esters of long-chain fatty acids.

Disinfectants and preservatives such as, for example, alkali metal salts of chlorinated phenols, aldehydes such as formaldehyde, heavy metal complexes of hydroxyquinolines etc.

Stabilisers such as epoxy compounds, esters of substituted cinnamic acids.

The following may be used as pigments:

White and coloured, inorganic or organic pigments such as lithopones, zinc sulphide, titanium dioxide, iron oxides, antimony oxide, chromium oxide, mixed oxides of cobalt/nickel and manganese, chromates such as lead chromate or strontium chromate, red lead, phthalocyanine pigments or other organic pigments etc.

The pigments may be blended in known manner with fillers such as silicic acids, silicates, sulphates, carbonates or aluminium oxide.

The paints may contain the pigments or mixtures of pigments and fillers in quantities of 100 to 1000% by weight, preferably 200 to 600% by weight, based on the binder.

The pH of the pigmented paint emulsions may be from 4 to 10, preferably 8 to 9. Adjustment of the pH is advantageously carried out by adding small quantities of bases such as ammonia or salts which when hydrolysed produce basic solutions, such as borax etc.

The pigmented paints according to the invention are produced by thorough mixing. This is advantageously carried out by making a paste of the pigments and fillers and the given wetting agents, defoaming agents, dispersing agents and preservatives as well as the amount of water required for producing a thin paste, and at the same time adding as much concentrated ammonia solution as is necessary for obtaining a final pH of 7.5 to 9. This process is advantageously carried out with the use of a high-speed stirrer. A sufficient quantity of approximately 5% by weight aqueous solution of a thickener to make the final consistency of the product pasty and suitable for painting is then added with slow stirring, and the binder is then slowly added in the form of the undiluted emulsion. If it is intended to add small amounts of plasticisers, these are added last to the finished emulsion. The individual components may also be added together in a different sequence.

Application of the pigmented paints to surfaces of wood, metals, plastics, glass, paper, brickwork, concrete, asbestos, cement etc. is carried out by the usual methods.

The pigmented paints according to the invention are distinguished by their high stability and they do not form a skin or foam.

The dry films have good weather resistance and good fastness to light and alkali resistance. They are further distinguished by having only a slight tendency to get dirty and they have excellent wet abrasion resistance. Their superiority to the usual commercial emulsions is apparent from Tables 1 and 2 in which the properties of clear films and pigmented films are compared.

The parts given in the examples are parts by weight and the percentage contents are percentages by weight unless otherwise indicated.

EXAMPLE

A mixture of pigment and extender, composed of 152 parts of titanium rutile pigment, 19 parts of finest talcum, 38 parts of ground heavy spar, 160 parts of dolomite and 11 parts of precipitated $CaCO_3$ is mixed by means of a high-speed stirrer with 135 to 145 parts of water to which 0.7 part of potassium phosphate, 3.0 parts of concentrated $NH_3$ solution and 9.0 parts of a suitable 10% solution of defoaming agent (e.g. tributyl phosphate) have been added. When the pigment paste is homogeneously dispersed, 38 parts of a 5% aqueous solution of a methyl cellulose are added with slow stirring, followed by 380 parts of a 50% binder emulsion prepared according to Example 2 of our copending patent application S.N. 689,957, filed December 12, 1967; the copolymer consists of 11.2% by weight of ethylene, 35.8% of vinyl acetate, 49.5% by weight of vinyl chloride and 3.5% by weight of maleic acid cyclohexyl semiester. The 50% binder emulsion was obtained by creaming up the 32% by weight emulsion described in Example 2 of our copending patent application S.N. 689,957, filed Dec. 12, 1967 with ammonium alginate. The stable pigmented emulsion paint described above can either be used as such or be further dispersed before use on rollers, sand mills, perl mills, granulating mills, disintegrators or dissolvers.

Other emulsions, indicated hereinafter under Nos. 1–7, were used for comparison instead of the above described binder emulsion according to the invention for the production of paints.

TABLE I

| Product | | Weather resistance (clear films on beechwood) | Light fastness (clear films 100 hours Xeno test) | Alkali resistance (clear films in 10% NaOH) |
|---|---|---|---|---|
| (1) | Polyvinyl acetate | 6 months severely affected, not dirty | Light fast | Destroyed after 1 day. |
| (2) | Copolymer of vinyl acetate and acrylic acid ester. | 6 months unchanged, dirty | do | Impaired after 3 days. |
| (3) | Polyvinyl propionate | 6 months unchanged, very dirty | do | Destroyed after 1 day. |
| (4) | Polyacrylic acid ester | do | do | Do. |
| (5) | Polymethacrylic acid ester | 6 months unchanged, not dirty | do | Softened after 4 weeks, otherwise unchanged. |
| (6) | Copolymer of butadiene/styrene | 4 months destroyed | Very sever yellowing | Unchanged after 4 weeks. |
| (7) | Copolymer of butadiene/styrene-acrylic acid ester. | 4 months almost destroyed | Slight yellowing | Do. |
| (8) | Polymer according to example of the present application. | 6 months unchanged, not dirty | Trace of yellowing | Do. |

TABLE I—Continued

| Product | Uptake of water vapour in percent by weight in clear films [1] after (hours)— | | | | Clouding of clear films with water [2] | Wet abrasion resistance of pigmented films;[3] first damage after a number of revolutions | Quality number [4] on abrasion, revolutions | |
|---|---|---|---|---|---|---|---|---|
| | 24 | 48 | 96 | 250 | | | 2,000 | 5,000 |
| (1) | ([5]) | ([5]) | ([5]) | ([5]) | 5 seconds, very cloudy | From 150 revolutions | 3 | 40 |
| (2) | 10 | 12 | 14 | 14 | 10 seconds trace cloudiness | From 300 revolutions | 25 | 40 |
| (3) | ([5]) | ([5]) | ([5]) | ([5]) | 5 seconds very cloudy | From 400 revolutions | 25 | 37 |
| (4) | 7 | 9 | 12 | 13 | 5 seconds slightly cloudy | From 300 revolutions | 23 | 35 |
| (5) | 6 | 7 | 7.5 | 7.5 | 40 seconds trace of cloudiness | From 1,000 revolutions | 12 | 33 |
| (6) | 3.5 | 5 | 6 | 6.5 | 5 seconds slightly cloudy | From 1,500 revolutions | 2 | 7 |
| (7) | 3.2 | 3.4 | 3.2 | 2.7 | 15 seconds trace of cloudiness | From 4,000 revolutions | 0 | 6 |
| (8) | 3.0 | 4.3 | 5.4 | 5.6 | 17 minutes trace of cloudiness | From 65,000 revolutions | 0 | 0 |

[1] Clear films were produced on glass fabric (10 x 10 cm.) by painting the surface with clear emulsion until the weight of film was 10 grams. The films were conditioned for 100 hours at 65% relative humidity at 20° C. and then introduced into 100% relative humidity and weighed after 24 hours, 48 hours, etc.
[2] A drop of water was placed on clear films which had been dried in air for 48 hours; the figures given indicate the time taken for cloudiness to appear and the degree of cloudiness.
[3] Films pigmented in accordance with the example of the invention and containing 300 parts of the given mixture of pigment and extender, based on the binder (solid), were applied in strips on panels of asbestos cement and subjected to an abrasion test as indicated in Table II; the number of revolutions after which damage to the coat of paint first occurs is indicated.
[4] Abrasion of the films was assessed after 2,000 and after 5,000 revolutions, and the quality indicated as a number ranging from 0 to 40, 0 corresponding to a completely undamaged film and 40 to a completely abraded film.
[5] Very high, over 20%, saponification.

TABLE II.—WET ABRASION RESISTANCE OF FILMS WITH DIFFERENT PIGMENT CONTENTS

| Product | | Pigment content (percent by weight) based on binder (solid) | | |
|---|---|---|---|---|
| | | 300 | 600 | 900 |
| (1) | Number of revolutions after which the first traces of abrasion show on the pigmented films. | From 150 | Immediately | Immediately |
| (2) | | From 300 | From 20 | Do. |
| (3) | | From 400 | From 30 | Do. |
| (4) | | From 300 | From 10 | Do. |
| (5) | | From 1,000 | From 150 | Do. |
| (6) | | From 1,500 | do | Do. |
| (7) | | From 4,000 | From 60 | Do. |
| (8) | | From 65,000 | From 500 | From 30. |

We claim:

1. A pigmented paint with a continuous aqueous phase which contains a binder consisting of a copolymer of (a) ethylene, (b) a half ester of maleic acid, fumaric acid or itaconic acid or an alkali metal or ammonium salt thereof and (c) a mixture of vinyl chloride and vinyl acetate or vinyl propionate, said mixture containing from 15 to 45% by weight of vinyl acetate or vinyl propionate and said copolymer containing from 9 to 20% by weight of copolymerized (a), 2 to 12% by weight of copolymerized (b) and 89 to 68% by weight of copolymerized (c).

2. The pigmented paint of claim 1 wherein the alcohol moiety of said half ester contains from 1 to 8 carbon atoms.

References Cited

UNITED STATES PATENTS 3,265,654 8/1966 Glabisch _____ 260—29.6
3,296,166 1/1967 Whitby _____ 260—29.6
3,423,353 1/1969 Levine _____ 260—29.6 T JULIUS FROME, Primary Examiner L. GARRETT, Assistant Examiner